Oct. 19, 1926.
J. B. SPEED
1,603,298
METHOD FOR AND MEANS OF SEPARATING ELECTROLYTES
Filed Dec. 17, 1924
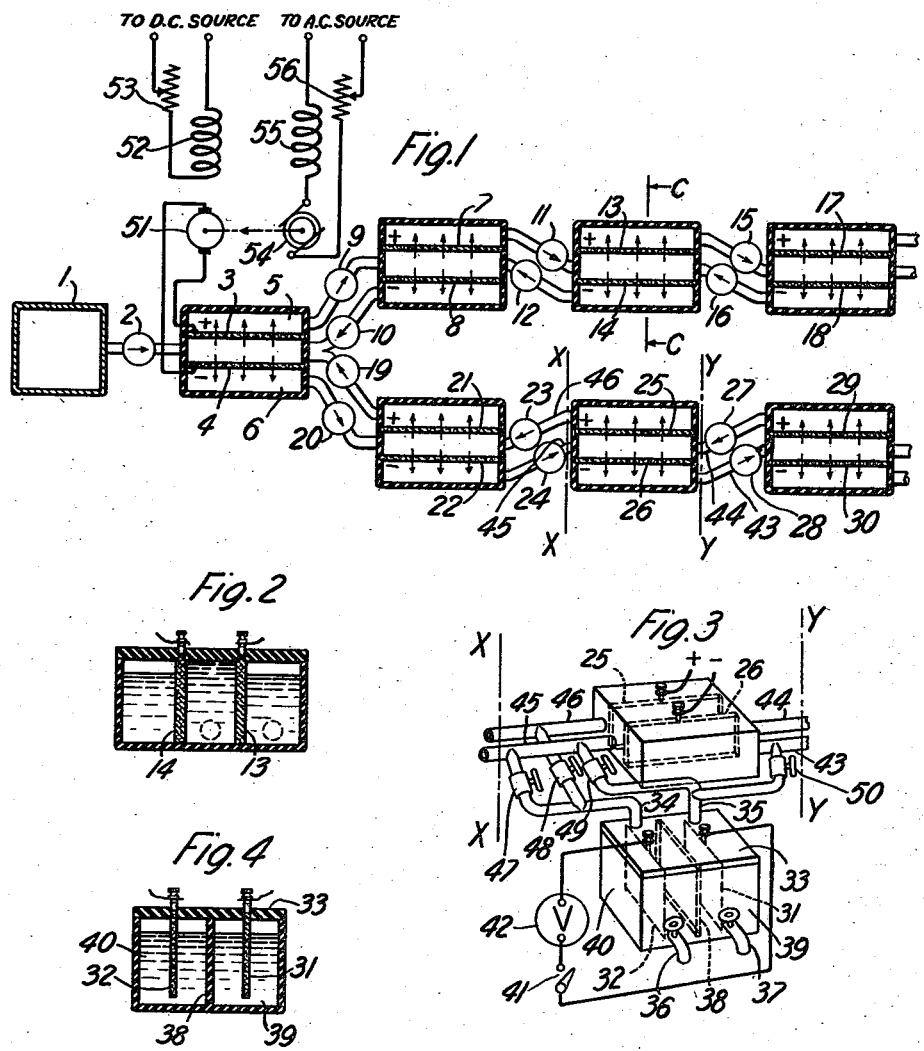
Inventor:
James Buckner Speed
by ⎯⎯⎯ Atty.

Patented Oct. 19, 1926.

1,603,298

UNITED STATES PATENT OFFICE.

JAMES BUCKNER SPEED, OF NEW YORK, N. Y., ASSIGNOR TO WESTERN ELECTRIC COMPANY, INCORPORATED, OF NEW YORK, N. Y., A CORPORATION OF NEW YORK.

METHOD FOR AND MEANS OF SEPARATING ELECTROLYTES.

Application filed December 17, 1924. Serial No. 756,390.

This invention relates to methods of separating substances and particularly to methods employing electric currents to effect the separation.

It has for an object to improve methods of purifying electrolytes.

Another object is the provision of methods of producing substances having a high degree of purity.

It is commonly known that if two inert metallic plates are immersed in an electrolyte and a potential difference is maintained between the two plates, in general, a metal is deposited upon one plate while oxygen is released at the other. Further, if the electrolyte comprises a solution containing more than one metallic element, in general, more than one metal will be deposited; for example, a potential difference applies between plates immersed in a solution comprising copper and iron salts would cause the deposition of both copper and iron upon one of the plates. If, however, the applied voltage is controlled it is often possible to cause only the more easily plated metal to be deposited and thereby cause a species of separation. This method of separation, is, however, often unsatisfactory as the metal to be deposited must be dissolved before it is in form for use as a solution. In accordance with this invention there is provided, a novel manner of applying electrolytic methods to separate electrolytes to produce extremely pure materials.

It has been found that a voltage applied between electrodes immersed in an electrolyte may be made so low that none of the metals contained in the electrolyte will be plated out upon an electrode immersed in the electrolyte. When such a sub-voltage is applied, one of the constituents of the electrolyte has been found to be attracted more to one electrode while the other constituent is attracted more to the other electrode. By removing the portions of the electrolyte near the electrodes, a partial separation of the electrolyte into its constituents may be effected. The invention provides a simple and effective means of purifying liquids by the application of a low potential difference to plates immersed in the mixture of electrolytes to be separated and removing the portions of the electrolytes in the vicinity of the electrodes.

A fuller understanding of the invention will be had from the more detailed description to follow.

Fig. 1 of the drawings represents a plan view of a series of cells as employed in accordance with the invention.

Fig. 2 is a cross sectional view in end elevation of a single cell, taken along the line C—C of Fig. 1.

Fig. 3 is a perspective view showing the connection of the control testing apparatus of the invention at the portion X—X Y—Y of Fig. 1.

Fig. 4 is an end view of the control testing apparatus of the invention.

An electrolyte 1 comprising a mixture of substances A and B, for example, is forced by a pump 2 for example, between suitable porous inert electrodes 3 and 4, carbon for instance, which are contained in an insulating casing. If no difference in potential is applied between the electrodes 3 and 4, the liquid will percolate through them due to the pressure applied and will flow into chambers 5 and 6 for instance, which are so joined to the electrodes that the liquid between the electrodes can communicate with the liquid outside them only by percolating through them. By applying a suitable voltage between the electrodes the liquid passing through one electrode may be made richer in A than the original electrolyte 1, while that passing through the other electrode is made richer in B.

In order to cause a continued percolation of liquid through the electrodes it has been found desirable to maintain a lower pressure outside the electrodes than between them. Under these conditions liquid will percolate through the electrodes and due to the action of the potential difference applied between the electrodes a certain amount of one constituent with some of the other constituent will pass through one electrode while the greater part of the second constituent with some of the first will pass through the other electrodes. For example, a certain amount of A with some of B would percolate through 3 while the greater part of B and some of A will pass through 4. The liquid passing through 3 possesses therefore, a greater ratio of A to B, for example, than the original electrolyte 1; and similarly, the liquid passing through 4 possesses a greater ratio of B to A than the original electrolyte.

In order to effect a still greater separation, a series of these individual cells may be employed, the original electrolyte in each cell being the richer in the constituents resulting from the separation produced in the cell preceding it in the series. For example, the liquid passing through plate 3 may be forced by a pump 9 into the space between plates 7 and 8 across which is applied a suitable sub-voltage. As described for plates 3 and 4, part of the liquid entering this second cell passes through plate 7 and by reason of the electrolytically stressed percolation, this part comprises a larger ratio of A to B than the liquid passing through plate 3.

Similarly, liquid which passes through plate 8 is richer in the ratio of B to A than that percolating through plate 3. It has further been found that this liquid passing through 8 comprises substantially the same composition as the liquid originally introduced between plates 3 and 4. This liquid may, therefore, be returned by means of a pump 10, for instance, to the space between plates 3 and 4.

This process may be continued until the desired ratio of A to B is obtained, the liquid which is richer in A being continuously transferred to a succeeding cell in the series. For example, the liquid passing through 7 may be transferred to the space between plates 13 and 14 and the liquid passing through 13, being still further enriched in A, may be transferred to the space between plates 17 and 18.

In order to obtain a liquid richer in B, the liquid percolating through 4 may be delivered between plates 21 and 22, the beginning of a second series of cells. Here again, a portion of the liquid passes through 21 and, in so doing, has its A constituent enriched relative to its B constituent by reason of the voltage applied. This enrichment has been found to so effect the composition of the liquid passing through 21 that it is substantially the same as the liquid passing through plate 8 which, as pointed out above, is substantially the same as the original liquid entering between plates 3 and 4. The liquid passing through 21 is therefore also returned to the space between plates 3 and 4. The liquid passing through 22, being enriched in B by virtue of the electrolytic stress in the cell 21—22, may be delivered, if desired, between 25 and 26 in order to effect a further enrichment in B. The liquid passing through 25 is then of such a composition that it can be returned to the cell carried forward to a succeeding cell 29—30, in the series.

In the representation and description given above, all plates have been represented as being charged symmetrically with the charges employed in the initial cell. Thus, for example, plates 3, 7, 13, 21, 25, etc., might comprise the positive electrodes, while plates 4, 8, 14, 22, etc., would then comprise the negative electrodes.

As a source of supply of voltage for the cells a generator may be connected to the terminals of the electrodes in each cell. In the drawings, a generator 51 is shown connected to the terminals of the electrodes 3 and 4 of the cell 3—4. The field for this generator is supplied by the coil 52 which is preferably separately excited from an outside source, as a power line, for instance, through the adjustable rheostat 53. The generator may be driven by a suitable motor 54 which has field excitation coils 55 and rheostat 56, the motor and field both being supplied with electrical energy from an outside source, as a power line, for example.

Such an arrangement as is shown with reference to cell 3—4 may be employed with each cell of the drawing. It will be understood that the arrangement as shown is purely illustrative, and that any other suitable source of electrical supply may be employed.

The porosity, thickness and area of the plates employed may be considerably varied, changes in these factors, of course, varying the pressures which must be employed inside and outside the plates to produce a flow through the plates which is satisfactory in accordance with the voltage applied. For a given set of plates, however, the desirable pressures and voltages may be determined in a number of ways.

One means of determining those voltages and pressures which produce the most satisfactory separation is to analyze the liquids passing through each set of electrodes. It is obvious, however, that such a method necessitates an excessive period of time for each control test, due to the period required for an analysis, and it has further been found that a quantitative chemical analysis is not a satisfactory means of determining the slight changes in composition which result in a single cell.

It has been found, however, that the composition of electrolytes determines the electro-chemical difference between said electrolytes, and that the electro-chemical difference of two electrolytes may be measured by the electro-motive force set up between two electrodes immersed in the two electrolytes.

In accordance with a feature of the invention there is provided, therefore, a simple and effective means of determining slight differences and changes in composition of electrolytes by measuring the electrochemical difference between said electrolytes, as an electric potential difference.

Referring to Figs. 3 and 4 of the drawings, suitable inert electrodes 31 and 32, carbon for example, are shown suspended from the top of an insulating casing 33, glass for example, which has inlets 34 and 35 and outlets 36 and 37. A porous porcelain plate or a semi-permeable membrane 38 divides the casing into two liquid tight compartments, 39 and 40. The electrodes 31 and 32 are connected through a switch 41 and a voltmeter 42; any sensitive voltmeter suitable for measuring sub-voltages may, of course, be employed at 42.

Such an apparatus may be connected in the series of cells at any desired point, the connection being illustrated by Fig. 3. In the arrangement shown, samples may be taken through either valve 47 or 49 from the pipe 45 carrying the liquid entering the cell, through valve 48 from the liquid passing through one plate, and through valve 50 from the liquid percolating through the other plate. All three sources of liquid may be compared in this apparatus with each other by controlling the respective valves 47, 48, 49 and 50 and closing the switch 41. Such an apparatus may be connected, in the manner shown, at various points in the series of cells and, by allowing a continuous stream of liquid to run from any two sources, as desired, into the compartments 39 and 40, while regulating the valves of the pumps 9, 10, 11, 19, 20, 24, etc. and the voltages applied between the porous electrodes 7, 8, 21, 22, etc. the voltage and pressure for the optimum separation may be obtained by determining the optimum potential difference between the electrodes 31 and 32 as indicated by voltmeter 42.

The preferred voltages and pressures have been found to vary with the porosities, and thickness and area of the plates 7, 8, 21, 22, etc., and the temperature of electrolytes employed. If, for reasons of construction efficiency, certain types of plates and certain temperatures are found desirable in a particular instance, the proper voltages and pressures may be determined by means of the control testing apparatus as described above.

While pumps have been represented in the drawings and description, any means of transferring the liquid from one chamber to another is, of course, suitable so long as the necessary pressure is maintained in the space between the porous electrodes. The pumps, it is manifest, serve the double purpose of maintaining an increased pressure between the plates, and a lower pressure in the outer chambers.

Any composition which is substantially chemically inert and is sufficiently porous may be used to replace carbon as a plate material in the cells. A closely woven net of noble metal, for instance, may be preferable in some cases.

It has been found that the ratio of volumes of liquid passing through the two plates within any cell may be varied, in accordance with the particular problem to be met by regulating the porosity and area and thickness of the plates.

If the separation desired is found to require a plurality of cells in the series, it has been found desirable to decrease the size of each succeeding cell in the series, in accordance with the ratio of volumes of liquid entering each cell.

The term "osmotically conducted" as employed in the appended claims is intended to describe the passage of an electric current from electrolyte on one side of a porous insulating member to electrolyte on the other side of said member, which is due to the ions passing through the openings in said porous member.

This method is economically adapted for commercial application as the current which is passed at the low voltages employed is very small and, therefore, the power necessary for application of this method is small.

What is claimed is:

1. The method of separating electrolytes which comprises placing said electrolytes in an enclosure, two walls of said enclosure being formed of porous inert conducting plates, exerting a pressure on said electrolytes, and applying a potential difference across said electrodes, said potential difference being of a smaller magnitude than is sufficient to effect an electro-plating action, said pressure causing a considerable portion of the liquid to be forced through the said plates.

2. The method of separating electrolytes which comprises placing said electrolytes in an enclosure, two walls of said enclosure being formed of porous inert conducting plates, exerting a pressure on said electrolytes, said pressure being at least large enough to force said electrolytes through said plates and actually forcing a considerable portion of the liquid through said plates, and at the same time applying a potential difference between said electrodes, said potential difference being of a smaller magnitude than is sufficient to effect an electroplating action.

3. The method of separating electrolytes which comprises placing said electrolytes in an enclosure with walls of porous conducting material, exerting a pressure on said electrolytes, and applying a potential difference between said plates, said potential difference being of a smaller magnitude than is sufficient to effect an electroplating action, and maintain a pressure sufficient to force a considerable portion of the liquid through the said plates.

In witness whereof, I hereunto subscribe my name this 11th day of December, A. D. 1924.

JAMES BUCKNER SPEED.